Aug. 9, 1966      T. ROSENBERG      3,264,821

CHAIN FOR LAMPS AND THE LIKE

Filed April 3, 1964

INVENTOR
THOMAS ROSENBERG

BY Sherman Levy ATTORNEY

United States Patent Office 3,264,821
Patented August 9, 1966

3,264,821
CHAIN FOR LAMPS AND THE LIKE
Thomas Rosenberg, Mount Vernon, N.Y., assignor to Eastern Chain Works, Inc., New York, N.Y.
Filed Apr. 3, 1964, Ser. No. 357,116
3 Claims. (Cl. 59—78.1)

This invention relates to a chain, and more particularly to a chain construction for use with lamps, fixtures, and the like.

An object of the present invention is to provide a chain which includes a plurality of interfitting and interconnected links wherein the links are provided with cuts therein which are arranged in an off-center position and wherein the cuts will be substantially hidden when the chain is being used.

Another object is to provide a chain which utilizes a safety link construction that provides smoother closing of the links as well as hidden cuts in the chain and an off-center safety cut link arrangement which is an improvement over old style end cut, side cut, or middle cut links.

A further object is to provide a safety link chain that is economical to manufacture and efficient in use and which is rugged in construction and highly pleasing or esthetic in appearance.

These and other objects of the invention will become apparent from a reading of the following specification and claims, together with the accompanying drawing, wherein like parts are referred to and indicated by like reference characters and wherein:

Referring in detail to the drawings, the numeral 10 indicates a lamp construction which may include a chain or chains 11 as well as a shade 12, and the chains 11 may be suspended from any suitable supporting structure.

Figure 1:
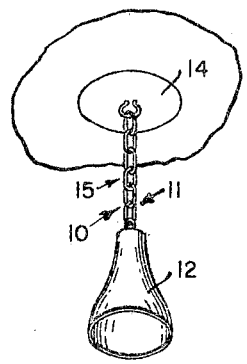
FIG. 1 is a fragmentary perspective view illustrating a lamp supported by a safety link chain constructed in accordance with the present invention.
Figure 2:
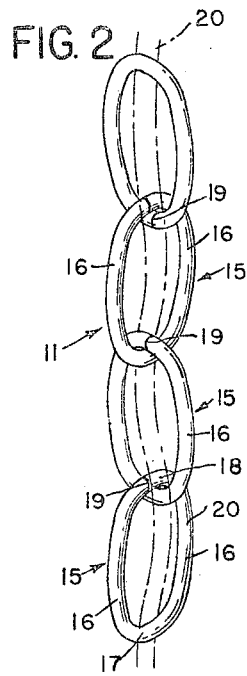
FIG. 2 is an enlarged perspective view showing a portion of the safety link chain of the present invention.
Figure 3:
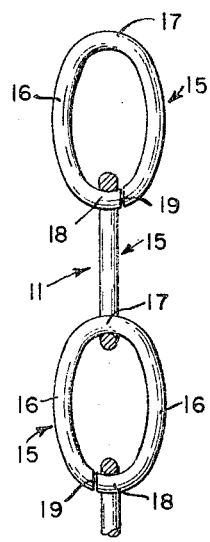
FIG. 3 is a vertical sectional view illustrating a portion of the safety link chain of the present invention.

As shown in figures such as FIGS. 2 and 3, the chain 11 of the present invention comprises a plurality of similar links which are indicated generally by the numeral 15 and which have a generally oval formation, and the links 15 are interconnected and interfitted together and these links 15 include spaced apart side portions 16 as well as diametrically opposed arcuate end portions 17 and 18. One of the arcuate end portions such as the end portion 18 is provided with a cut 19 therein which is offset or off-center from the intermediate portion or center of the arcuate end portion 18 as shown in FIG. 3. In FIG. 2 the numeral 20 shows or illustrates in dotted or broken lines a portion of an electric wire that is adapted to be used in conjunction with the chain 11 and the wire 20 is adapted to cooperate with the off-center cuts 19 to help hide or cover the cuts 19 so as to enhance the appearance or attractiveness of the chain.

Figures 4, 5, 6:
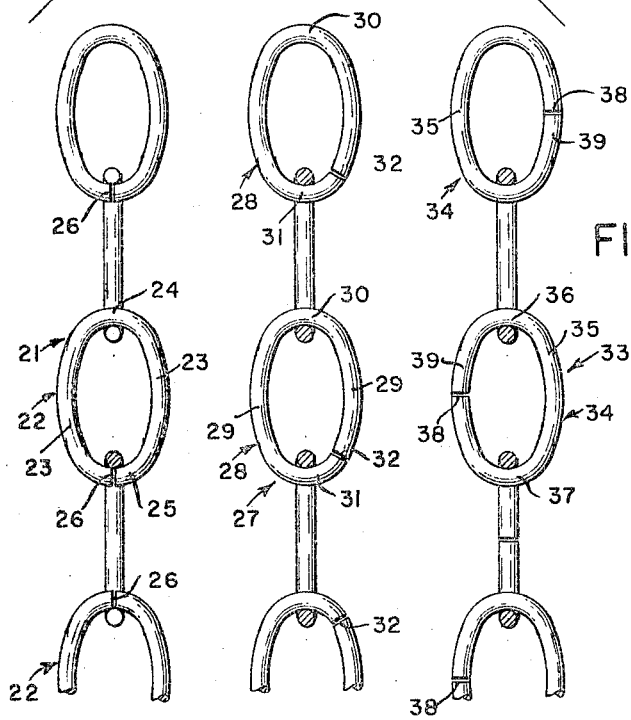
FIGS. 4, 5 and 6 are fragmentary vertical sectional views showing the old style or prior art types of chains.

Attention is directed to FIG. 4 wherein there is illustrated an old style or prior art type of end cut chain which is indicated generally by the numeral 21, and the old style end cut chain 21 includes interconnected links 22 which include side portions 23 and end portions 24 and 25, and the cut 26 is arranged in the middle of the end portion 25 and this is disadvantageous and unsafe because if the links are not properly closed, twisting or undue stress on the chain may pull the links through or apart.

In FIG. 5 there is shown a further old style side cut chain which is indicated generally by the numeral 27, and the chain 27 includes interconnected links 28 which comprise side portions 29 and opposed end portions 30 and 31. In FIG. 5 the cut 32 is arranged as shown and this is a side cut link and is disadvantageous since if the links are not properly closed, there will result rough edges and unsightly openings.

In FIG. 6 there is another prior art or old style type of chain which is indicated generally by the numeral 33 and which includes the interconnected links 34 that have the side portions 35 and 39, as well as the end portions 36 and 37, and the side portion 39 has the middle cut 38 and this has the disadvantage of causing rough edges with an unsightly cut 38 in the link that is visible.

As compared to the prior art chains shown in FIGS. 4, 5 and 6, the safety link chain of the present invention provides for smoother closure of the link, as well as a hidden cut in the chain, and the off-center safety cut link.

Figure 7:
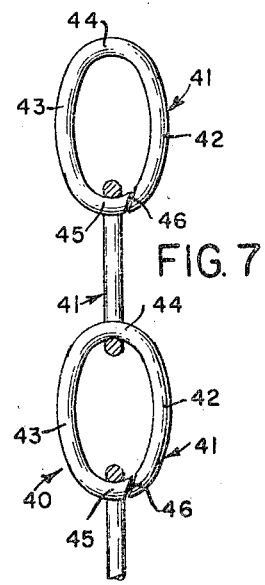
FIG. 7 is a fragmentary view illustrating a modification or alternative chain construction.

Attention is directed to FIG. 7 wherein there is illustrated a slight modification or alternative form of construction of the present invention wherein the numeral 40 indicates a portion of a chain having similar interconnected links 41 which each include spaced apart side portions 42 and 43 as well as diametrically opposed arcuate end portions 44 and 45, and one of the end portions such as the end portion 45 is provided with an off-center cut 46. The cut 46 is adapted to be arranged angularly with respect to the longitudinal axes of the side portions 42 and 43, whereas the previously described off-center cut 19 may be provided or arranged so that it is substantially parallel to the longitudinal axes of the side portions 16.

From the foregoing, it will be seen that there has been provided an improved safety link chain construction for use in various applications such as in conjunction with lamps, chandeliers or other members or appliances. The safety link of the present invention includes links such as the links 15 which have the cut 19 in an end portion 18, and the cut 19 is arranged off-center from the middle of the end portion 18 so that the cut will be substantially hidden and in addition will provide other advantages such as increased safety. The cut 19 may be arranged so that it is substantially parallel to the side portions 16. Or, as shown in FIG. 7 the cut such as the cut 46 may be arranged so that it is inclined or slightly angled with respect to the longitudinal axes of the side portions such as the side portions 42 and 43, and with the cut 46 arranged as shown in FIG. 7, there is provided not only the cut which is off-set from the center of the end portion 45, but in addition due to the inclined arrangement of the cut 46, there is provided contiguous flat surfaces in the vicinity of the cut 46 which have a slightly greater cross-sectional area than the surfaces defined or provided by a cut such as the cut 19.

The parts can be made of any suitable material and in different shapes or sizes.

With the present invention the cut is substantially hidden, and in addition the wire such as the electric wire 20 helps cover the cut due to the location thereof. In the old style shown in FIG. 4, if the links are not properly made or closed they may separate, and the arrangement shown in FIG. 4 is unsafe if the links are not properly closed because twisting or undue stress on the chain may pull the links apart. As to the arrangement shown in FIG. 5, if the links are not properly closed, rough edges are present and in addition there is the unsightly openings. As to the old style middle cuts shown in FIG. 6, the cut such as the cut 38 is off on the side and the appearance is not desirable especially when the chain is being used for hanging fixtures such as lamps or chandeliers, and in addition the middle cut of FIG. 6 has rough edges with the unsightly cut in the links being visible.

On the other hand the safety link construction of the present invention provides far smoother closure of the links as well as the hidden cuts in the chains and the off-center safety cut link arrangement, and when the electric wire is in place, the wire extends along the links to make the cuts even more hidden from view. Chains constructed according to the present invention can be used for any desired purpose as required or desired.

Minor changes in shape, size and rearrangement of details coming within the field of invention claimed may be resorted to in actual practice, if desired.

What is claimed is:

1. In a chain for lamps, chandeliers and the like, a plurality of links interconnected together, each of said links including spaced apart side portions and diametrically opposed arcuate end portions, there being a cut in one of the end portions of the links, and said cut being offset from the center of the said one arcuate end portion, whereby there is provided contiguous plane surfaces adjacent the cuts, the cuts being substantially parallel to the longitudinal axes of the side portions of the links.

2. In a chain for lamps, chandeliers and the like, a plurality of links interconnected together, each of said links including spaced apart side portions and diametrically opposed arcuate end portions, there being a cut in one of the end portions of the links, and said cut being offset from the center of the said one arcuate end portion, said cuts being arranged angularly with respect to the longitudinal axes of the side portions of the links whereby there is provided contiguous flat surfaces adjacent the cuts that are arranged at an inclination and angle with respect to the side portions of the links.

3. In a chain for lamps, chandeliers and the like including a wire, a plurality of links interconnected together, each of said links including spaced apart side portions and diametrically opposed arcuate end portions, there being a cut in one of the end portions of the links, and said cut being offset from the center of the said one arcuate end portion, and said wire adjacent to said links and said wire helping to cover the cuts in the links.

References Cited by the Examiner

UNITED STATES PATENTS

| | | | |
|---|---|---|---|
| 1,085,625 | 2/1914 | McKinnon | 59—35 |
| 1,146,612 | 7/1915 | Carter | 59—35 |
| 1,670,758 | 5/1928 | Witherow | 59—83 |
| 1,772,930 | 8/1930 | D'Olier | 59—78.1 |

CHARLES W. LANHAM, *Primary Examiner.*

G. P. CROSBY, *Assistant Examiner.*